United States Patent [19]
Czajkowski

[11] Patent Number: 5,175,695
[45] Date of Patent: Dec. 29, 1992

[54] ULTRASONIC MEASURING APPARATUS

[75] Inventor: Geoff S. B. Czajkowski, Limerick, Ireland

[73] Assignee: Suparules Limited, Limerick, Ireland

[21] Appl. No.: 833,641

[22] Filed: Feb. 10, 1992

Related U.S. Application Data

[63] Continuation of Ser. No. 7,578,072, Sep. 5, 1990, abandoned.

[30] Foreign Application Priority Data

Sep. 11, 1989 [IE] Ireland .................................. 2904/89

[51] Int. Cl.$^5$ .............................................. G01S 03/80
[52] U.S. Cl. ...................................... 364/561; 367/127
[58] Field of Search ..................... 33/1 P; 364/561; 362/99, 108, 118, 127

[56] References Cited

U.S. PATENT DOCUMENTS

| | | | |
|---|---|---|---|
| 3,076,519 | 2/1963 | Alsabrook | 367/108 X |
| 4,254,478 | 3/1981 | Dumas | 367/2 |
| 4,455,556 | 6/1984 | Koshio et al. | 364/561 X |
| 4,894,810 | 1/1990 | Jukkala | 367/118 |

FOREIGN PATENT DOCUMENTS

8704527  7/1987  World Int. Prop. O. .

Primary Examiner—Kevin J. Teska
Assistant Examiner—Edward R. Cosimano
Attorney, Agent, or Firm—Ladas & Parry

[57] ABSTRACT

An ultrasonic measuring apparatus comprising a master unit and a slave unit each having a respective transmitter circuit for transmitting towards the other unit a burst of ultrasound and each having a respective receiver circuit to detect the burst of ultrasound transmitted by the other unit. The slave unit is responsive to the detection of a burst transmitted by the master unit to transmit a return burst back to the master unit. The master unit includes control means for disabling its receiver circuit during transmission of the said burst to the slave unit and thereafter until the end of a first period of time which is sufficiently long to permit all echoes from the said burst to decay to a level where the master unit receiver circuit is not sensitive enough to detect them. The master unit further has means for determining the distance between the master and slave units as a function of the time elapsed between the end of the first period of time and the detection by the master unit of the return burst from the slave unit.

8 Claims, 5 Drawing Sheets

ULTRASONIC MEASURING APPARATUS

This is a continuation of copending application Ser. No. 07/578,072, filed on Sep. 5, 1990, now abandoned.

This invention relates to an ultrasonic measuring apparatus.

BACKGROUND OF THE INVENTION

An apparatus of the above kind is known which comprises a hand-held and/or tripod mountable master and slave units. In use of the apparatus the slave unit is placed at a location whose distance from the master unit is to be measured. Each unit has a respective transmitter circuit for transmitting towards the other unit a burst of ultrasound and each unit has a respective receiver circuit to detect the burst of ultrasound transmitted by the other unit.

The measuring process starts when a 'GO' or start button is pressed which causes the master unit to transmit a short ultrasonic burst to the slave unit, which responds to the detection of such burst by transmitting a short ultrasonic return burst back to the master unit. The master unit determines the distance between the master and slave units based upon the time elapsed between the transmission of the outward burst by the master unit and the detection of the return burst by the master unit.

This elapsed time (which represents double the desired distance) is used, according to a well known equation, including air temperature which is sampled and supplied as an input quantity, to calculate the distance travelled in air equivalent to half the elapsed time, which is then displayed on a suitable display.

This known apparatus has several major disadvantages, and the present invention and preferred embodiment seek to mitigate these disadvantages.

The prior art apparatus referred to above uses two different ultrasonic transmission frequencies for the master unit and slave unit, 25 KHz for the master unit and 40 KHz for the slave unit. The reason for this is to attempt to make the master unit receiver circuit immune to unwanted echoes of its own outward burst, so that only a return burst from the slave unit is detected.

This works quite well in open spaces. However, in a cluttered environment, and despite the different return frequency, the master unit receiver circuit will nevertheless respond to high level echoes of its own outward burst bouncing off nearby objects, thereby giving false readings.

To avoid this one would need highly sophisticated and hence expensive filters in the master unit receiver circuit to reliably discriminate between e.g. a 'faint' 40 KHz return burst from the slave unit and a 'loud' 25 KHz echo from a nearby object.

Instead, however, the prior art apparatus overcomes the problem by taking up to 25 successive measurements, and only displays a reading when four measurements coincide. This can take several seconds per reading, and the need to have four coincident measurements militates against the user holding a master unit and moving slowly but continuously towards or away from a static slave unit with the 'GO' button continuously pressed in order to establish a desired distance from the slave unit.

SUMMARY OF THE INVENTION

It is therefore a primary object of the present invention to provide an apparatus of the above kind which avoids both the need for expensive filters to operate reliably in a cluttered environment, but which also avoids the need to take more than one measurement per displayed reading.

Accordingly, the invention provides an ultrasonic measuring apparatus comprising a master unit and a slave unit each having a respective transmitter circuit for transmitting towards the other unit a burst of ultrasound and each having a respective receiver circuit to detect the burst of ultrasound transmitted by the other unit, the slave unit being responsive to the detection of a burst transmitted by the master unit to transmit a return burst back to the master unit, wherein the master unit includes control means for disabling its receiver circuit during transmission of the said burst to the slave unit and thereafter until the end of a first period of time which is sufficiently long to permit all echoes from the said burst to decay to a level where the master unit receiver circuit is not sensitive enough to detect them, and wherein the slave unit includes control means for effecting transmission of the said return burst back to the master unit only at the end of a second period of time, equal in duration to the said first period of time, after detection of the said burst from the master unit, the master unit further having means for determining the distance between the master and slave units as a function of the time elapsed between the end of the first period of time and the detection by the master unit of the return burst from the slave unit.

The advantage of the invention is that by disabling the master unit receiver circuit during transmission of the outward burst and until the end of a period of time thereafter which is sufficiently long to permit all echoes from the outward burst to decay to a level where the master unit receiver circuit is not sensitive enough to detect them, one no longer has to worry about the master unit receiver circuit responding to anything other than a return burst from the slave unit.

Of course, as a consequence of this disable period of the master unit receiver circuit, in order to maintain the slave unit in (offset) sync. with the master unit the slave unit cannot be allowed to transmit a return burst immediately back to the master unit, but has to wait until the end of a period exactly equal to the disable period of the master unit receiver circuit.

Thus the time elapsed between the end of the disable period of the master unit receiver circuit and the detection by the master unit of a return burst from the slave unit is determinative of the round trip shortest distance in air between the master unit and the slave unit.

A fuller explanation of how to determine the disable period of the master unit receiver circuit will be described later when the embodiment of the invention is described in detail.

Since the possibility of interference by echoes has been eliminated, only a single measurement per displayed reading need by made. Thus the master unit can be used while the user is holding it and walking slowly towards the slave unit. Further, without the need to take more than one measurement per displayed reading, readings to be taken at a faster rate than in the prior art, e.g. at 0.5 second intervals in the embodiment to be described.

A second disadvantage of the prior apparatus is that, because the master unit transmission frequency (25 KHz) is different, from the slave unit transmission frequency (40 KHz), two transducers are necessary in each unit, one resonating at 25 KHz and one at 40 KHz.

Therefore, in the preferred embodiment of the invention, the frequency of the outward burst transmitted by the master unit is substantially the same as the frequency of the return burst transmitted by the slave unit, so that only a single ultrasonic transducer is necessary in each unit. This is possible because the need to prevent the master unit receiver circuit from responding to unwanted echoes of itself is now eliminated by inhibiting the receiver circuit for a period after transmission of an outward burst as previously mentioned.

In the embodiment, the, frequency of both the units is substantially 40 KHz. This avoids a problem, present in the prior art, of unwanted triggering of the master and-/or slave units by environmental noise, it being appreciated that 25 KHz is an audio frequency to be found in environmental noise.

Clearly, since there is no point in the master unit having a greater 'range' than the slave unit and vice versa, the transmission power and receiver circuit sensitivity of the master unit are preferably substantially the same as the transmission power and receiver circuit sensitivity of the slave unit.

In the foregoing and in the claims the term 'DISABLE' is meant to be construed in a broad sense to mean to switch off or in any other way inhibit or render ineffective the relevant receiver circuit of the master unit or slave unit, as the case may be.

BRIEF DESCRIPTION OF THE DRAWINGS

An embodiment of the invention will now be described, by way of example, with reference to the accompanying drawings, in which.

DETAILED DESCRIPTION

As will be described, the embodiment of the invention is implemented in a combination of hardware components and a suitably programmed microprocessor.

However, it is to be clearly understood that if desired the functions to be described could be performed entirely by hardware, or alternatively a greater degree of programming could be used. The 'position' of the hardware/software boundary is a design decision based inter alia upon cost, size and performance, and is not material to the invention.

Figure 1:
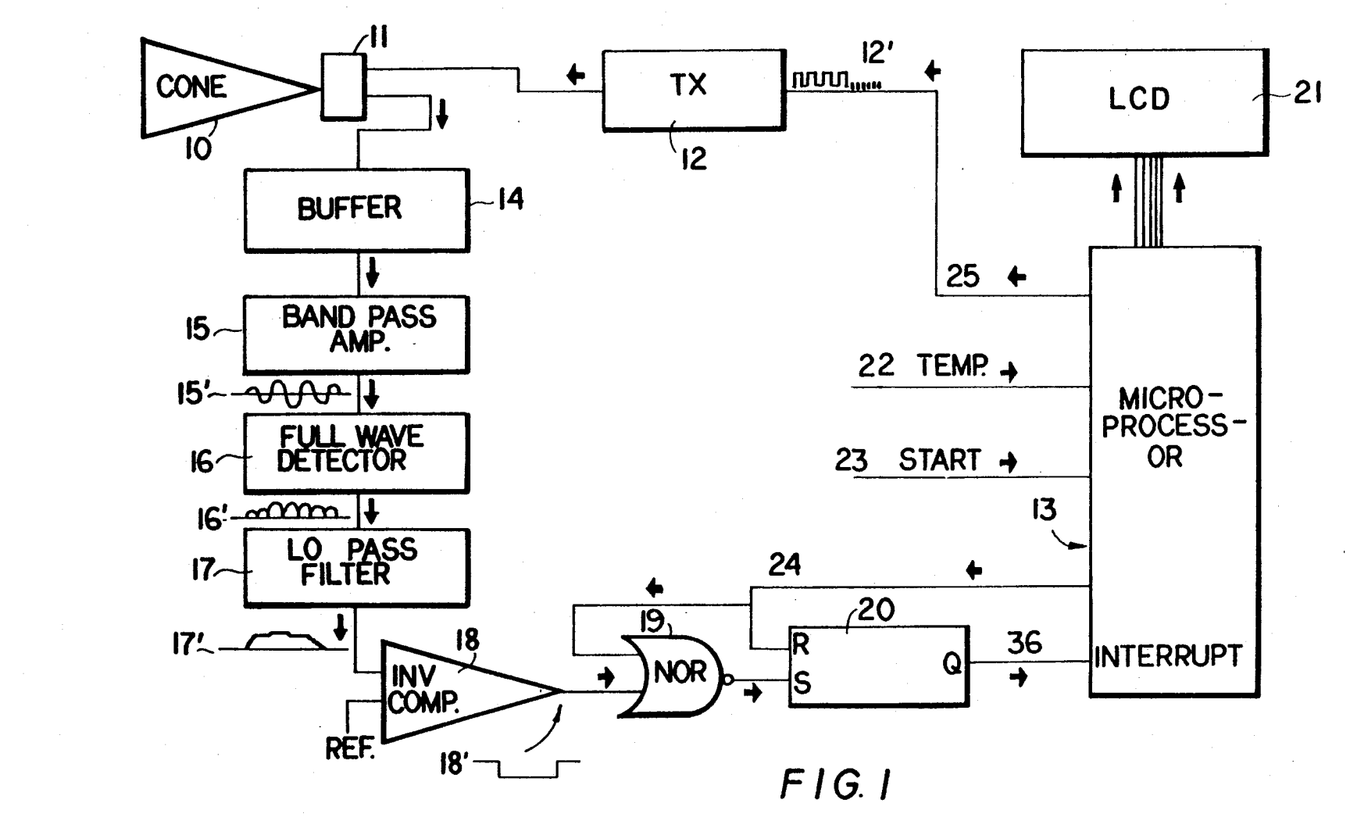
FIG. 1 is a block circuit diagram of a master unit.
Figure 2:
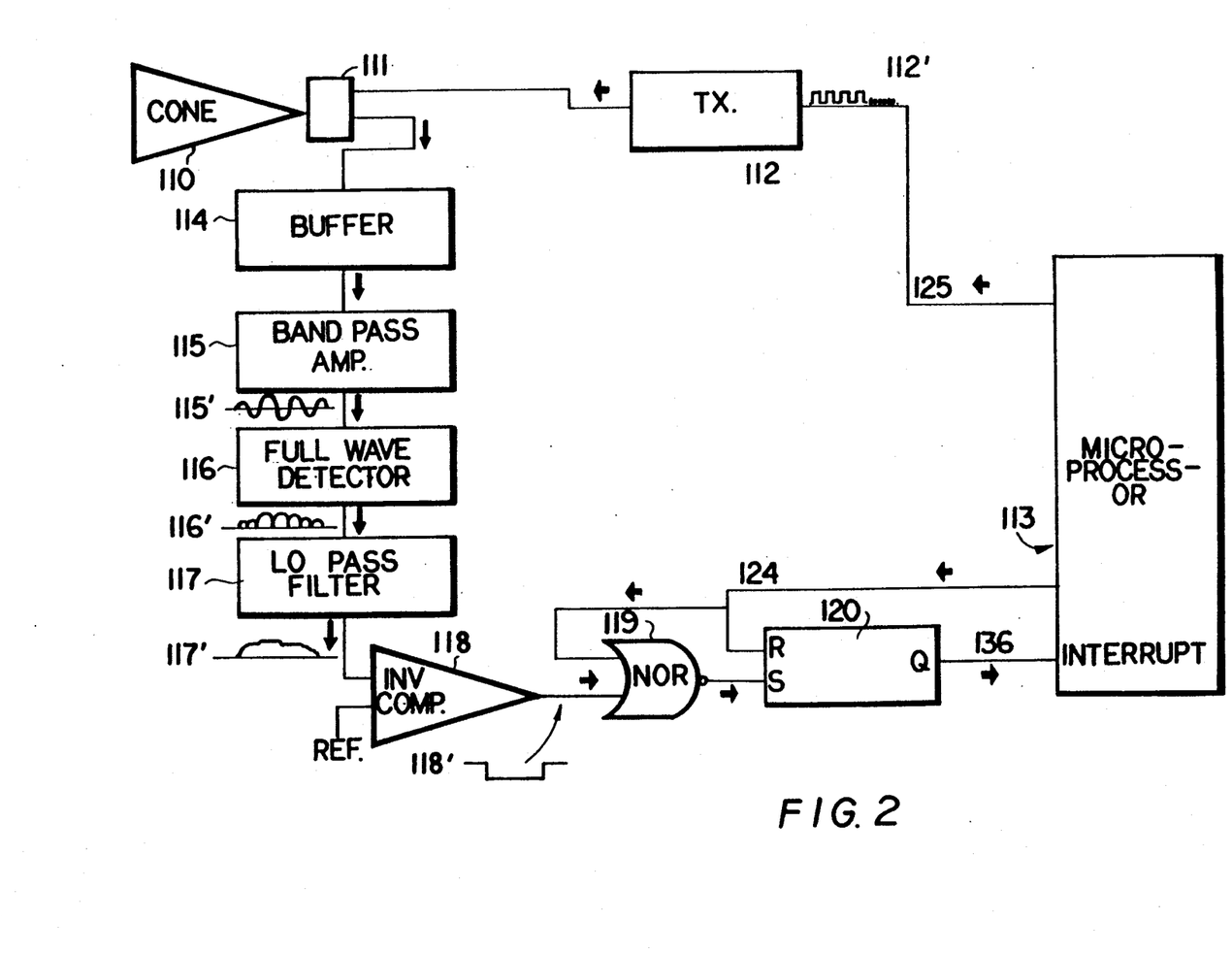
FIG. 2 is a block circuit diagram of a slave unit.

Before starting the detailed description, it should be pointed out that apart from the internal programming of the microprocessors the physical construction of the master and slave units is substantially identical, the only difference being the presence in the master unit FIG. 1 of the LCD display 21, the TEMP. input line 22 and the STAT input line 23, which are absent in the slave unit (FIG. 2).

Thus each component of the slave unit shown in FIG. 2 has been given a reference numeral greater by one hundred than the corresponding component of the master unit shown in FIG. 1 i.e. a 1 has been inserted before every reference numeral of FIG. 1 for the corresponding component of FIG. 2, and the description of the construction and, except where explicitly stated otherwise, operation of each component of the master unit may be taken as referring also to the construction and operation of the corresponding component in the slave unit.

Figure 3:
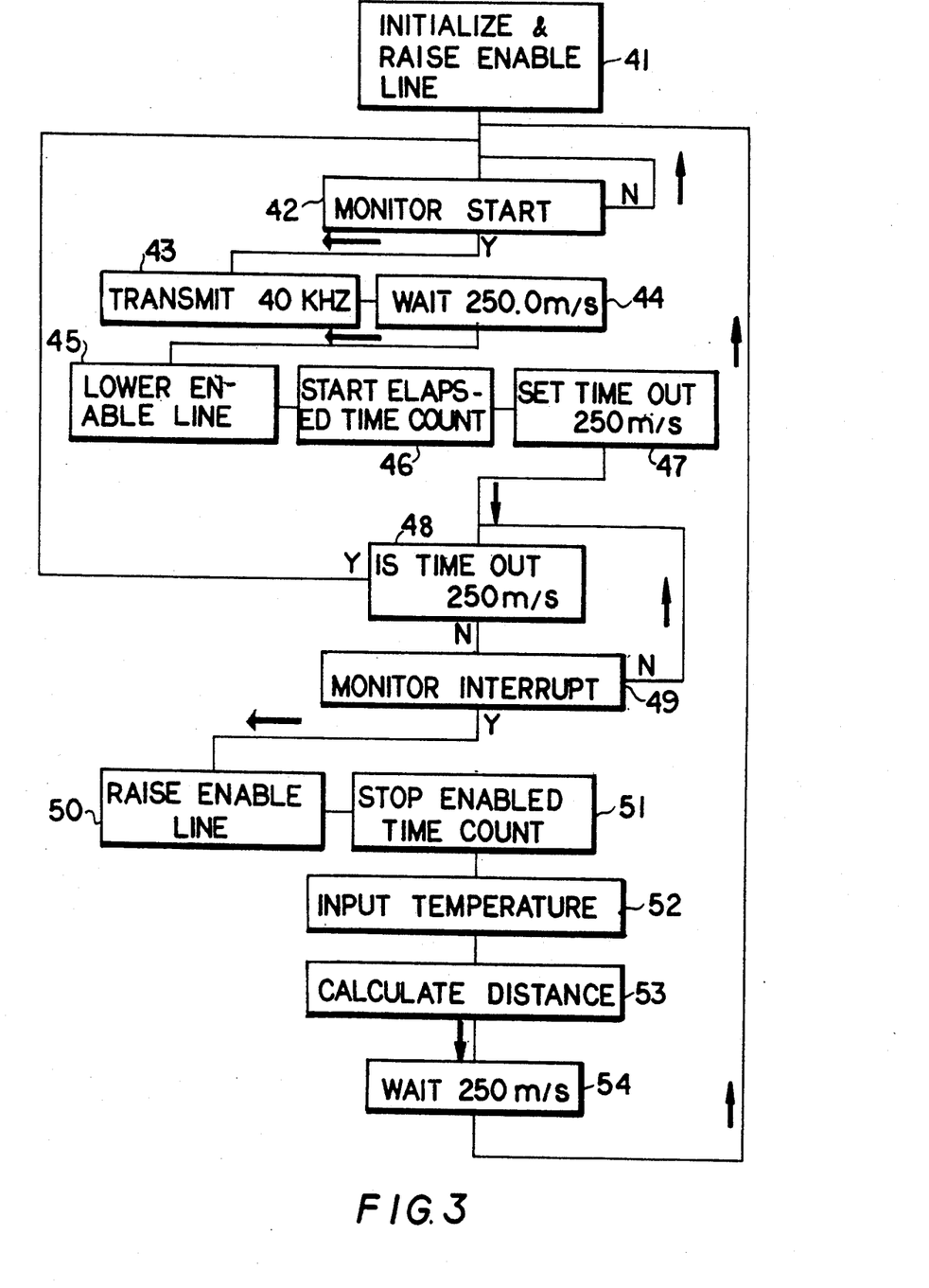
FIG. 3 is a flow diagram of the control program in the microprocessor 13 of the master unit.
Figure 4:
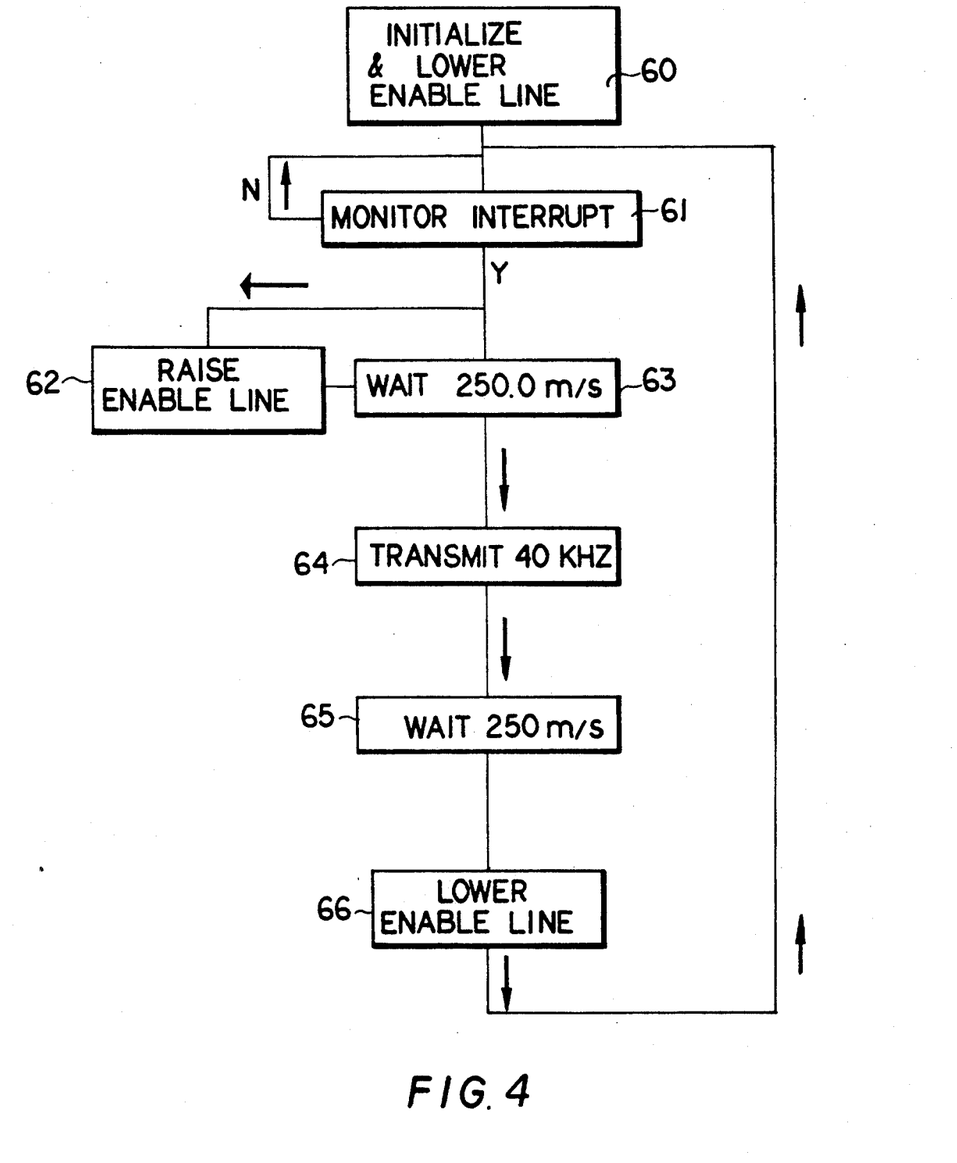
FIG. 4 is a flow diagram of the control program in the microprocessor 113 of the slave unit.

Naturally the programming of the two microprocessors is different, however, with the flow chart for the master unit control program being shown in FIG. 3 and that for the slave unit control program being shown in FIG. 4.

The master and slave units will first be described component by component with reference to FIGS. 1 and 2, followed by a description of a typical cycle of operation of the units with additional reference to FIGS. 3 to 5.

Referring to FIG. 1, the master unit is controlled by a microprocessor 13 which, in response to an input signal on the START line 23, supplies to an output line 25 a series of sixteen 5 volt pulses 12' at a repetition, rate of 25 microseconds which is equivalent to 40 KHz. The START line 23 is connected to a manually operable button (not shown), which if pressed provides the signal on the line 23.

The sixteen pulses 12' pass to a transmitter circuit 12 which comprises a step-up transformer driven by a Darlington pair. The transformer develops 200 volt peak-to-peak pulses across an ultrasonic transducer 11 which is in the form of a 40 KHz ceramic resonator. The transducer 11 is connected to a cone 10 tuned to 40 KHz which thus emits a very short burst of 40 KHz ultrasound.

Turning briefly to FIG. 2, the transmitter circuit 112, transducer 111 and cone 110 of the slave unit are identical to those of the master unit, and operate in exactly the same way to transmit a very short burst of 40 KHz ultrasound in response to sixteen pulses 112' on the line 125, except that in the case of the slave unit the pulses 112' are supplied in response to the slave unit control program in the microprocessor 113, as will be described.

Returning to FIG. 1, the master unit comprises a receiver circuit for detecting a 40 KHz burst from the slave unit, the receiver circuit comprising the components 14 to 18 and disable logic 19 and 20 which, as will be described, disables or renders the receiver circuit ineffective at certain times, so that it is effectively switched off insofar as the microprocessor 13 is concerned. As will be described, the disable logic is controlled by a signal on a line 24 from the microprocessor 13, the presence of a logic level '1' on line 24 disabling the receiver circuit, and the presence of a logic level '0' on the line 24 enabling the receiver circuit. Thus the line 24 is herein called the 'ENABLE LINE'.

In the receiver circuit a buffer and clamp 14 first provides impedance matching and also clamps the maximum voltage e.g. 2 volts. This is to ensure that the 200 volt pulses applied to the transducer 11 during transmission of a burst do not harm the following components 15 to 18 of the receiver circuit. At this point it should be explained that although the receiver circuit is disabled by the logic 19 and 20 during burst transmission, this logic is positioned after the components 14 to 18 which could therefore be damaged by the transmission burst even though the receiver circuit is disabled.

The buffer 14 is followed by a 40 KHz band pass amplifier 15 with a high Q, which feeds into a full wave detector 16. The output of the band pass amplifier 15 in response to a burst from the slave unit being detected by the master unit cone 10 and transducer 11 is shown schematically by the waveform 15', and the output of the full wave detector 16 is shown by the waveform 16' where the negative-going cycles in 15' have been inverted.

Next a 2 KHz low pass filter 17 forms the envelope 17' of the waveform 16. The envelope 17' is passed to one input of an inverting comparator 18 where it is compared with a reference threshold level REF. applied at the other input of the comparator. The threshold level is chosen according to the level of signal it is desired to detect and to eliminate noise. The output of the comparator 18 is shown at 18', the output signal going low (logic 0) when the threshold level REF is exceeded by the input signal 17'.

The disable logic comprises a NOR gate 19 to one input of which is supplied the signal from the comparator 18. The other input of the NOR gate receives its input from the microprocessor 13 via the enable line 24, the line 24 also being connected to the reset input 'R' of an R-S flip-flop 20. The set input 'S' of the flip-flop is connected to the output of the NOR gate 19, and the 'Q' output of the flip-flop is fed to an interrupt input of the microprocessor 13 via a line 36. The operation of the disable logic will be described later.

Returning again to FIG. 2, the slave unit has a receiver circuit comprising components 114 to 120 identical to those of the master unit, and in response to a burst from the master unit being detected by the slave unit cone 110 and transducer 111, the slave unit receiver circuit components 114 to 118 operate in exactly the same way as do the equivalent components 14 to 18 in the master unit in response to a burst from the slave unit as described above.

However, although the disable logic components 119 and 120 of the slave unit are physically the same as the equivalent components 19 and 20 in the master unit, they are differently controlled by the microprocessor 113, as will be described with reference to FIGS. 3 to 5.

Thus, so far, we have described two units, a master unit and a slave unit each having a respective transmitter circuit for transmitting towards the other unit a burst of ultrasound and each having a respective receiver circuit to detect the burst of ultrasound transmitted by the other unit. In fact in this embodiment the transmitter and receiver circuits in each unit are substantially identical (allowing for component tolerances), so that the power of the burst transmitted by the master unit is substantially the same as that transmitted by the slave unit, and the sensitivity of the master unit receiver circuit is substantially the same as that of the slave unit receiver circuit.

In this embodiment, the transmitted power and receiver circuit sensitivity are together chosen such that each unit has a range of about 200 feet. In other words, if the master unit and slave unit are placed with their cones 10 and 110 facing one another at a distance of 200 feet, the burst from the master unit will be just strong enough at the slave unit for detection by the slave unit receiver circuit, and the burst from the slave unit will be just strong enough at the master unit for detection by the master unit receiver circuit.

In these circumstances the voltage developed by either transducer 11 or 111 will typically range from 2 microvolts to 4 volts according to the distance apart of the two units.

The operation of the apparatus will now be described with additional reference to FIGS. 3 to 5.

Considering first the master unit, when this is powered up (switched on) the microprocessor 13 first initialises itself and raises the enable line 24 (FIG. 3, step 41). This puts a logic '1' at the reset input 'R' of the flip-flop 20 and also at the upper input of the NOR gate 19. The lower input to the NOR gate 19 is also at logic '1', since this is the quiescent state of the output of the inverting comparator 18. Thus the output of the NOR gate, and hence the set input 'S' of the flip-flop 20, is at logic '0' since if either one or both of the inputs of a NOR gate are at logic '1' the output will be logic '0'. The logic '1' placed at the reset input 'R' of the flip-flop 20 places the 'Q' output at logic '0'.

Thus the initial state of the disable logic of the master unit is a logic '1' on each input of the NOR gate 19, a logic '0' at the set input 'S' of the flip-flop 20, a logic '1' at the reset input 'R' of the flip-flop 20, and a logic '0' at the 'Q' output of the flip-flop 20 and hence also at the interrupt input of the microprocessor 13 which is connected to the 'Q' output of the flip-flop 20 by the line 36.

It will be recognised that the presence of the logic '1' provided by the microprocessor 13 via the enable line 24 to the upper input of the NOR gate 19 blocks the gate and effectively disables the receiver circuit of the master unit. In other words, no pulse 18' can pass the NOR gate 19 to set the flip-flop 20, so that the 'Q' output of the flip-flop will remain at logic '0' irrespective of the arrival of any pulse 18' while the reset input 'R' of the flip-flop 20 remains high (logic 1). This means that so far as the microprocessor 13 is concerned, the master unit receiver circuit is switched off by the logic '1' on the ENABLE line 24.

Figure 5:
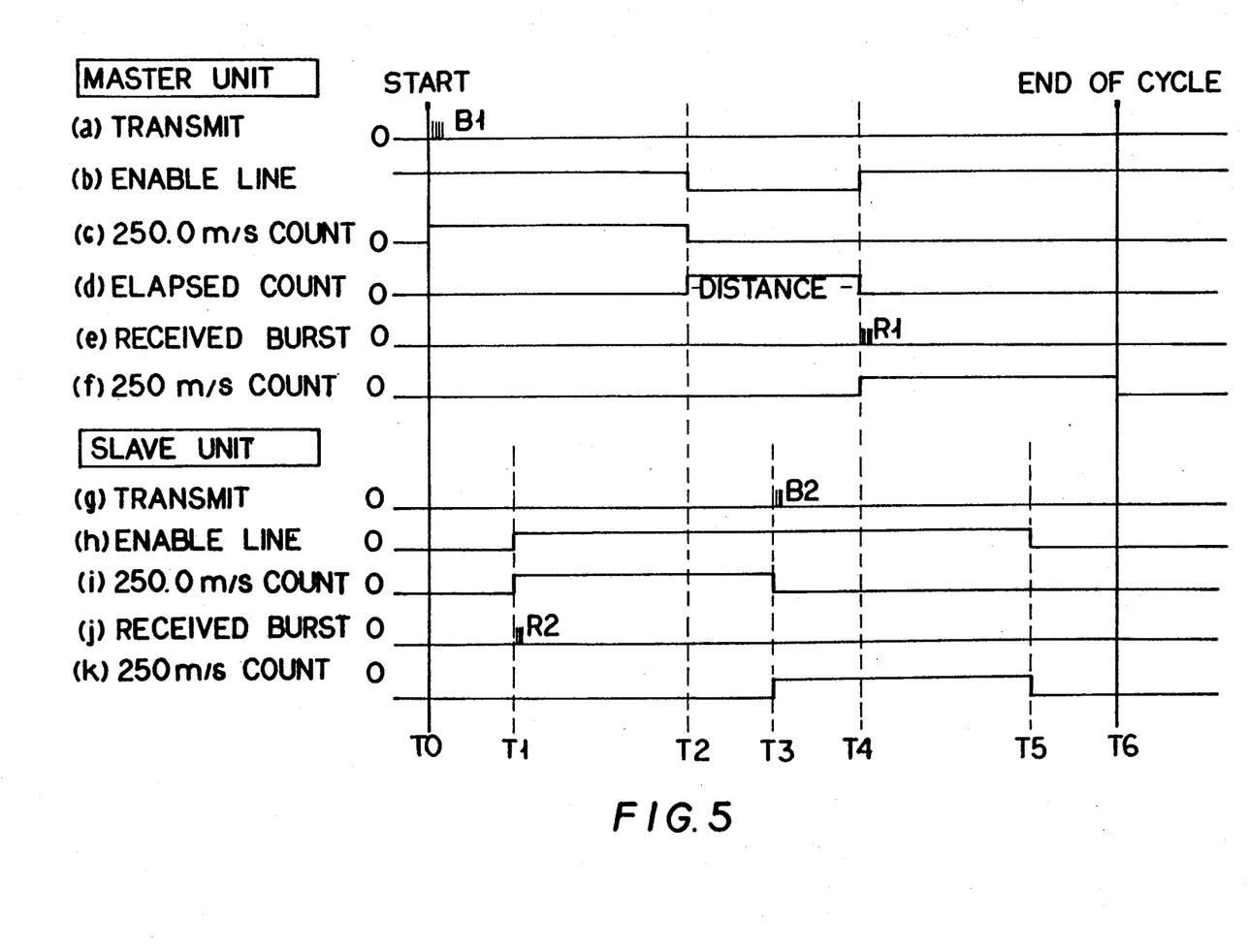
FIG. 5 is a timing diagram illustrating the operation of the master and slave units.

This is the situation appertaining for the master unit immediately before time TO in the timing diagram of FIG. 5, line ,b, thereof showing the logic level of the master unit ENABLE line 24 which is set at logic '1' to disable the master unit receiver circuit.

Turning now to the slave unit, when the slave unit is first powered up the microprocessor 113 first initialises itself including resetting the flip-flop 120 by briefly raising the ENABLE line 124 to logic level '1'. This places a logic '0' at the 'Q' output of the flip-flop 120 and hence also at the interrupt input of the microprocessor 113 which is connected to the 'Q' output of the flip-flop 120 by the line 136. After the brief raising of the enable line 124 to logic level '1' it is then immediately lowered to logic level '0'. All the foregoing is represented by FIG. 4, step 60.

The lowering of the slave unit ENABLE line 124 to logic '0' puts a logic '0' at the reset input 'R' of the flip-flop 120 and also at the upper input of the NOR gate 119. The lower input to the NOR gate 19 is at logic '1', since this is the quiescent state of the output of the inverting comparator 118. Thus the output of the NOR gate 119, and hence the set input 'S' of the flip-flop 120, is at logic '0' since as already mentioned if either one or both of the inputs of a NOR gate are at logic '1' its output will be logic '0'.

Thus the initial stage of the disable logic of the slave unit is a logic '1' on the lower input of the NOR gate 119, a logic '0' on the upper input of the NOR gate 119, a logic '0' at the set input 'S' of the flip-flop 120, and a logic '0' at the 'Q' output of the flip-flop 120 and hence also at the interrupt input of the microprocessor 113 which is connected to the 'Q' output of the flip-flop by the line 136.

It will be recognised that the presence of the logic '0' provided by the microprocessor 113 via the ENABLE line 124 to the upper input of the NOR gate 119 opens the gate to pulses such as 118'. Thus the negative-going leading edge of any such pulse 118, will cause the lower input of the NOR gate 119 to go to logic '0' which, because there is a logic '0' also on the upper input of the NOR gate, will cause the output of the NOR gate 119 to go high (logic 1). This will set the flip-flop 120 causing its 'Q' output to go to logic '1' and hence the interrupt input of the microprocessor 113 to go to logic '1' causing an interrupt. This means that so far as the microprocessor 113 is concerned, the slave unit receiver circuit is enable or switched on by the logic level '0' on the ENABLE line 124.

This is the situation for the slave unit appertaining immediately before time TO in the timing diagram of FIG. 5, line h thereof showing the logic level of the ENABLE line 124 immediately before time TO but after the initial brief flip-flop reset pulse which is not shown.

Thus both master and slave units are now at a point just to the left of TO in FIG. 5, waiting for a measurement to begin. A measurement cycle is triggered by the application of a start signal to the START input line 23 to the master unit microprocessor 13. This is assumed to occur at time TO in FIG. 5, and is detected in 42 of the master unit control program (FIG. 3) which monitors the state of the START line 23 by interrogating the line at 4 microsecond intervals (the microprocessor cycle time).

Immediately a START signal is detected, at time TO, step 43 of the master unit control program causes the microprocessor 13 to supply the set of sixteen pulses 12' (FIG. 1) which cause the master unit to transmit a short ultrasonic burst B1 (line a of FIG. 5).

At the same time, at step 44 in FIG. 3 and as shown at line c in FIG. 5, the master unit control program counts clock signals to define a wait period during which the enable line 24 is maintained at its logic 1 level and the NOR gate 19 remains blocked, thereby maintaining the master unit receiver circuit disabled during the wait period. In FIG. 5 the wait period is from TO to T2.

This wait period is carefully chosen in relation to the particular transmission power and receiver circuit sensitivity of the master unit such that all echoes from the burst B1 decay to a level where the master unit receiver circuit is not sensitive enough to detect them. In the present case where a range of 200 feet has been assumed, in the worst case the master unit would be able to detect its own echo bouncing off a non-absorbent wall 100 feet away. Thus the wait period must be greater than the time for sound to travel 200 feet.

Since at room temperature sound travels one foot in slightly under one millisecond, a wait period of at least 200 milliseconds should be used. For safety's sake we have chosen a wait period of 250.0 milliseconds as shown in step 44 of FIG. 3, this being the time period from TO to T2. The significance of the decimal place will be explained later.

At the end of the wait period, at time T2, the master unit control program does three things: it lowers the ENABLE line 24 (step 45 of FIG. 3 and line b of FIG. 5), it starts an internal elapsed time counter which counts clock signals and ultimately will give a measure of the distance between the master and slave units (step 46 of FIG. 3 and line d of FIG. 5), and it sets a time out period of 250 milliseconds (step 47 of FIG. 3).

It will be appreciated that lowering the ENABLE line 24 at the end of the 250.0 millisecond wait period puts a logic '0' at the upper input of the NOR gate 19, thereby opening this gate to any negative going pulse 18', whose leading edge would give a logic '1' at the NOR gate output. This would set the flip-flop 20, causing the 'Q' output to go high (logic 1), providing an interrupt to the microprocessor 13. Thus a logic '0' at the upper input of the NOR gate 19 is equivalent to switching on the master unit receiver circuit so far as the microprocessor 13 is concerned.

Meanwhile, the burst B1 from the master unit has arrived at the slave unit at time T1—see received burst R2 at line j of FIG. 5. This burst R2 is detected by the slave unit control program at step 61, which continuously monitors the interrupt line 136 (FIG. 2) from the 'Q' output of the flip-flop for a logic '1'. It will be recalled that since the ENABLE line 124 is at logic '0' the NOR gate 119 is open to pulses 118, whose leading edge will set the 'Q' output of the flip-flop 120 to logic '1' as previously described.

As soon as the burst B1 transmitted by the master unit is detected as the received burst R2 by the slave unit, as evidenced by the interrupt on the line 136, the slave unit control program raises the enable line 124 to logic level '1' (step 62 of FIG. 4 and line h of FIG. 5) and counts a wait period of 250.0 milliseconds (step 63 of FIG. 4 and line i of FIG. 5).

Raising the ENABLE line 124 effectively disables or switches off the slave unit receiver circuit for reasons already discussed in relation to the master unit.

After the wait period of 250.0 milliseconds the slave unit control program causes a short ultrasonic burst B2 to be transmitted back to the master unit (step 64 of FIG. 4 and line g of FIG. 5). This occurs at time T3, where, (T3−T1)=(T2−T0)=250.0 milliseconds.

The reason for the 250.0 millisecond wait period from T1 to T3 is to ensure accurate synchronisation of the master and slave units. Thus, since the elapsed time count in the master unit only started 250.0 milliseconds after transmission of the burst B1 and (as will be described) is stopped by detection of the return burst B2, it is essential that the return burst B2 be delayed by exactly that same amount, i.e. 250.0 milliseconds.

The need for strict accuracy is here emphasised by the use of the decimal place when referring to the period of 250.0 milliseconds. In other places where a 250 millisecond wait is required, it is not critical that this be exactly 250 milliseconds and a few milliseconds or even a few tens of milliseconds deviation either way is acceptable except where stated to the contrary and provided that the wait is not less than about 200 milliseconds.

After transmission of the burst B2, the slave unit control program counts a wait period of 250 milliseconds (step 65 of FIG. 4 and line k of FIG. 5) while maintaining the reset line 124 high (line h of FIG. 5). This is to give the slave unit immunity to its own transmission burst B2 and to echoes thereof in the same way as was done for the master unit transmission burst B1. It will be recalled that when the enable line 124 is at logic '1' the NOR gate 119 is closed and hence the slave unit receiver circuit is disabled or effectively switched off as far as the microprocessor 113 is concerned.

At the end of the 250 millisecond wait period (at time T5) the slave unit ENABLE line 124 is placed at logic '0' once more to enable or switch on the slave unit receiver circuit (step 66 of FIG. 4 and line h of FIG. 5). It will be noted that the total time that the slave unit receiver circuit has been disabled is from T1 to T5, that is to say for a period having a duration equal to (T2−T0)+(T5−T3), since (T3−T1)=(T2−T0).

The return burst B2 transmitted by the slave unit at time T3 arrives at the master unit at time T4 (line e of FIG. 5), where (T4−T3)=(T1−T0). It is detected by the master unit control program at step 49 in FIG. 3, which is equivalent to step 61 in FIG. 4 for the slave unit and provides an interrupt on line 36 (FIG. 1) to the microprocessor 13.

In the present case it is assumed that the interrupt occurs before the 250 millisecond time out expires as determined by step 48 of FIG. 3. The time out test at step 48 simply ensures that if a return burst R1 is not received within 250 milliseconds after burst transmission at step 43, the control program does not hold at step 49 indefinitely, but hands control back to step 42.

Upon detection at time T4 by the master unit of the return burst R1 as evidenced by a logic '1' on the interrupt line 36 to the microprocessor 13, FIG. 1, the master unit control program raises the ENABLE line 24 (step 50 of FIG. 3 and line b of FIG. 5) to disable or switch off the master unit receiver circuit, and also stops the elapsed time counter (step 51 of FIG. 3 and line d of FIG. 5). The count accumulated in the elapsed time counter represents the time for a burst of ultrasound to make the return journey from the master unit to the slave unit and back again, i.e. the time (T4−T2).

Since the speed of sound in air is a function of temperature, at step 52 of FIG. 3 the temperature is sampled by the microprocessor 13 (FIG. 1) via a sensor (not shown) connected to the line 22. Then, in step 53 of FIG. 3, the distance between the master and slave units is calculated using the elapsed count and the air temperature. The calculation is well-known to those skilled in the art, and does not need quoting here. The result is displayed on the liquid crystal display device 21 of the master unit shown in FIG. 1.

Finally, at step 54 of FIG. 3 and line f of FIG. 5, the master unit control program counts a 250 millisecond wait period. This is necessary since otherwise a fresh burst B1 could be transmitted by the master unit immediately after T4, yet the slave unit receiver circuit would still be disabled when the burst B1 reached it, i.e. (T5−T4) is greater than (T1−T0). Hence the 250 millisecond wait, but in fact any wait period will be sufficient provided it is no less than (T5−T3).

At the vertical line at time T0 marked 'END OF CYCLE' all components are back to the state they were in immediately prior to time T0, and a new cycle can begin as soon as a START signal is received on the input line 23. Indeed, if the start button is held down continuously a reading will be taken about every half a second (assuming the go and return time for the bursts is not near its upper limit), and since only one measurement is made per reading, readings can be taken continuously on the move. This and the immunity from noise are substantial advantages over the prior art referred to in the introduction.

In the foregoing embodiment the master clock frequency of the microprocessors 13 and 113 is 2.58 MHz giving master clock signals with a period of about 0.4 microseconds. It is these clock signals, or where less accuracy can be accepted a subset of them obtained by division, which are counted by the microprocessor control to determine the various wait and other time periods referred to in the foregoing. The counters may be software counters or real time hardware counters.

It is to be understood that although the embodiment described above uses the same frequencies for the master unit and slave unit, this is preferable but not essential. If one were to use, for example, a 25 KHz frequency master burst and a 40 KHz slave burst, it would be necessary to modify the embodiment to incorporate two transducer/cone assemblies on each unit, one tuned to 25 KHz and the other to 40 KHz.

Further, the transmitter circuit of each unit would need to be set to the frequency of the others receive frequency and the receiver circuit tuned to the frequency of the burst from the other unit.

However, even though this is not the preferred embodiment, valuable advantages would still be obtained in cluttered environments by the need to take only one measurement per reading using the delay scheme of the present invention.

Finally, like the prior art referred to in the introduction, the master and slave units are housed in hand-held and/or tripod mountable casings, the electronic components being mounted on a printed circuit board within the casing.

I claim:
1. An ultrasonic measuring apparatus comprising a master unit and a slave unit each having a respective transmitter circuit for transmitting towards the other unit a burst of ultrasound and each having a respective receiver circuit to detect the burst of ultrasound transmitted by the other unit, the slave unit being responsive to the detection of a burst transmitted by the master unit to transmit a return burst back to the master unit, wherein the master unit includes control means for disabling its receiver circuit during transmission of the said burst to the slave unit and thereafter until the end of a first period of time which is sufficiently long to permit all echoes from the said burst to decay to a level where the master unit receiver circuit is not sensitive enough to detect them, said receiver circuit including a pulse shaping circuit for providing a digital output pulse in response to a detected burst, a logic gate having first and second inputs connected respectively to the output of the pulse-shaping circuit and to the control means, and having an output, and a latch means having first and second inputs respectively connected to the output of the logic gate and to the control means and having an output connected to the control means, said receiver circuit being disabled by the control means blocking the logic gate and being enabled by the control means unblocking the logic gate, the latch means being set by a digital output pulse passing through the unblocked logic gate and being reset when the logic gate is blocked and wherein the salve unit includes control means for effecting transmission of the said return burst back to the master unit only at the end of a second period of time, equal in duration to the said first period of time, after detection of the said burst from the master unit, the master unit further having means for determining the distance between the master and slave units as a function of the time elapsed between the end of the first period of time and the detection by the master unit of the return burst from the slave unit.

2. An apparatus as claimed in claim 1, wherein upon the detection of the burst transmitted by the master unit the slave unit control means disables the slave unit receiver circuit until the end of a third period of time equal in duration to the said first period of time plus a fourth period of time which is sufficiently long to permit all echoes from the said return burst to decay to a level where the slave unit receiver circuit is not sensitive enough to detect them, and wherein upon detection of the said return burst from the slave unit the master unit control means re-inhibits the master unit receiver circuit until the end of a fifth period of time having a duration no less then the fourth period of time.

3. An apparatus as claimed in claim 1, wherein the means in the master unit for determining the distance between the master and slave units comprises means for counting clock signals the said counting means being started at the end of the first period of time and stopped upon the detection of a return burst from the slave unit.

4. An apparatus as claimed in claim 1, wherein the frequency of the burst transmitted by the master unit is substantially the same as the frequency of the return burst transmitted by the slave unit.

5. An apparatus as claimed in claim 4, wherein the frequency is substantially 40 KHz.

6. An apparatus as claimed in claim 4, wherein the transmitter and receiver circuits of each unit share a respective common ultrasonic transducer.

7. An apparatus as claimed in claim 4, wherein the transmission power and receiver circuit sensitivity of the master unit are substantially the same as the transmission power and receiver circuit sensitivity of the slave unit.

8. An apparatus as claimed in claim 7, wherein both the first and fourth periods of time each has a duration of no less than 200 milliseconds.

* * * * *